US008643530B2

(12) United States Patent
Bernhardt

(10) Patent No.: US 8,643,530 B2
(45) Date of Patent: Feb. 4, 2014

(54) APPARATUS FOR RADAR TARGET CLOAKING USING POLYHEDRAL CONDUCTING MESH

(75) Inventor: Paul A Bernhardt, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 396 days.

(21) Appl. No.: 12/980,383

(22) Filed: Dec. 29, 2010

(65) Prior Publication Data

US 2011/0163903 A1 Jul. 7, 2011

Related U.S. Application Data

(60) Provisional application No. 61/292,189, filed on Jan. 5, 2010.

(51) Int. Cl.
*H01Q 17/00* (2006.01)

(52) U.S. Cl.
USPC ............................................................ 342/1

(58) Field of Classification Search
USPC ............................................................ 342/1
See application file for complete search history.

(56) References Cited

U.S. PATENT DOCUMENTS

| | | | | |
|---|---|---|---|---|
| 3,224,000 A | * | 12/1965 | Cross et al. | 342/10 |
| 4,814,546 A | * | 3/1989 | Whitney et al. | 174/36 |
| 4,928,130 A | * | 5/1990 | Pfabe et al. | 342/9 |
| 5,442,360 A | * | 8/1995 | Maignan et al. | 342/120 |
| 6,008,753 A | * | 12/1999 | Berg et al. | 342/165 |

OTHER PUBLICATIONS

P.A. Bernhardt, T. Ainsworth, K. Groves, T. Beach, R. G. Caton, C. S. Carrano, C. M. Alcala, and D. D. Sponseller, "Detection of ionospheric structures with L-band synthetic aperture radars," Proceedings of the 2008 IEEE Geoscience and Remote Sensing Symposium, Boston, MA, Jul. 6-11.
H. Liu and J. Zou, "On unique determination of partially coated polyhedral scatterers with far field measurements," Inverse Problems 23, pp. 297-308, 2007.
P.A. Bernhardt, C.L. Siefring, J.F. Thomason, S.P. Rodriquez, A.C. Nicholas, S.M. Koss, C. Hoberman, and D.L. Hysell, "The Design and Applications of a Versatile HF Radar Calibration Target in Low Earth Orbit," Radio Sci., 43, RS1010, doi:10.1029/2007RS003692, Feb. 7, 2008.
A.C. Ludwig, "Wire Grid Modeling of Surfaces," IEEE Transactions on Antennas and Propagation, 35, 1045-1048, 1987.

(Continued)

*Primary Examiner* — Jack W Keith
*Assistant Examiner* — Frank J McGue
(74) *Attorney, Agent, or Firm* — US Naval Research Laboratory; Joslyn Barritt

(57) ABSTRACT

An apparatus for interfering with and canceling electromagnetic reflections from a conducting object such as a solid or hollow conducting sphere. The reflection of an incident electromagnetic wave from a conducting sphere can be reduced or cancelled by placing a polyhedral conducting mesh (PCM) around the conducting sphere. The incident EM wave induces electric fields in the region between the conducting mesh and the internal conducting sphere. These induced electric fields may interfere with and in some cases may completely cancel the incident EM wave and thus reduce reflection. The PCM can be tuned to reduce or cancel reflection of incident EM waves at one or more specific frequencies.

24 Claims, 10 Drawing Sheets

(56) References Cited

OTHER PUBLICATIONS

C.W. Trueman and S.J. Kubina, "Fields of Complex-Surfaces Using Wire Grid Modeling," IEEE Transactions on Magnetics, 27, 4262-4267, 1991.

A. Rubinstein, F. Rachidi, and M. Rubinstein, "On wire-grid representation of solid metallic surfaces," IEEE Transactions on Electromagnetic Compatibility, 47, 192 195, 2005.

B. Chambers and A. Tennant, "Optimized design of Jaumann radar absorbing materials using a genetic algorithm," IEE Proceedings—Radar Sonar and Navigation, 143, 23 30, 1996.

H.C. Strifors, and G.C. Gaunaurd, "Scattering of electromagnetic pulses by simple-shaped targets with radar cross section modified by a dielectric coating," IEEE Transactions on Antennas and Propagation, 46, 1252-1262, 1998.

H. Mosallaei and Y., Rahmat-Samii, "RCS reduction of canonical targets using genetic algorithm synthesized RAM," IEEE Transactions on Antennas and Propagation, 48, 1594-1606, 2000.

\* cited by examiner

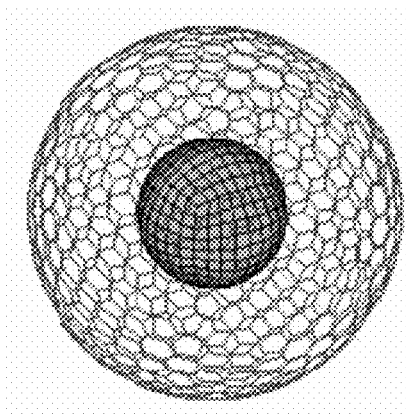
$D_{Mesh}/D_{Ball} = 2.5$  FIG. 5D
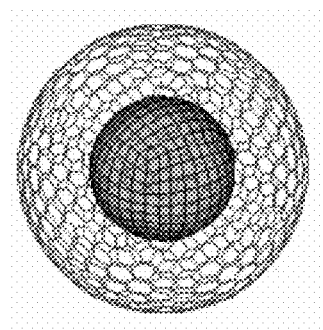
$D_{Mesh}/D_{Ball} = 2$  FIG. 5C
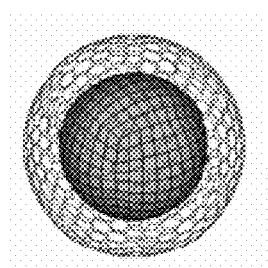
$D_{Mesh}/D_{Ball} = 1.5$  FIG. 5B
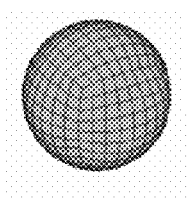
$D_{Mesh}/D_{Ball} = 1$  FIG. 5A

APPARATUS FOR RADAR TARGET CLOAKING USING POLYHEDRAL CONDUCTING MESH

CROSS-REFERENCE

This application is a nonprovisional application of and claims the benefit of priority based on U.S. Provisional Patent Application No. 61/292,189 filed on Jan. 5, 2010, the entirety of which is hereby incorporated by reference into the present application.

TECHNICAL FIELD

The present invention relates to radar tracking, particularly the cloaking of radar targets to avoid tracking or identification.

BACKGROUND

Radar can operate in either monostatic or bistatic form. In either case, a radar pulse is emitted by a transmitting antenna, scatters off a target, and the scattered pulse is received by a receiving antenna. In monostatic radars, the transmitting and receiving antennas are the same, and the only reflected signal received is the signal that reflects back in the original direction. In bistatic radars, the transmitting antenna and the receiving antenna are separated by a distance that is comparable to the expected target distance.

In monostatic radars, the portion of the scattered signal that is received by the original antenna is known as radar backscatter, and is characterized by a backscatter radar cross-section (RCS).

The backscatter RCS of a radar signal has many uses. For example, the position of the target can be determined from the round-trip propagation time. Other characteristics such as velocity and size of the target may also be determined by analysis of the scattered radar signal.

Solid conducting spheres have been used as radar calibration targets because they have a backscatter RCS that is well known in terms of analytic solutions and because this RCS is independent of viewing direction. See P. A. Bernhardt, T. Ainsworth, K. Groves, T. Beach, R. G. Caton, C. S. Carrano, C. M. Alcala, and D. D. Sponseller, "Detection of ionospheric structures with L-band synthetic aperture radars," *Proceedings of the 2008 IEEE Geoscience and Remote Sensing Symposium*, Boston, Mass., Jul. 6-11, 2008; H. Liu and J. Zou, "On unique determination of partially coated polyhedral scatterers with far field measurements," *Inverse Problems* 23, 297-308, 2007; P. A. Bernhardt, C. L. Siefring, J. F. Thomason, S. P. Rodriquez, A. C. Nicholas, S. M. Koss, C. Hoberman, and D. L. Hysell, "The Design and Applications of a Versatile HF Radar Calibration Target in Low Earth Orbit," *Radio Sci.*, 43, RS1010, doi:10.1029/2007RS003692, 7 Feb. 2008; and G. T. Ruck, D. E. Barrick, W. D., Stuart, C. K. Krichbaum, *Radar Cross Section Handbook*, Plenum Press, New York, 1970.

Wire grids have been used to approximate solid objects. See H. Liu, et al., supra and Bernhardt and Siefring, et al., supra. See also A. C. Ludwig, "Wire Grid Modeling Of Surfaces," *IEEE Transactions on Antennas and Propagation*, 35, 1045-1048, 1987; C. W. Trueman and S. J. Kubina, "Fields Of Complex-Surfaces Using Wire Grid Modeling," *IEEE Transactions On Magnetics*, 27, 4262-4267, 1991; and A. Rubinstein, F. Rachidi, and M. Rubinstein, "On wire-grid representation of solid metallic surfaces," *IEEE Transactions On Electromagnetic Compatibility*, 47, 192-195, 2005.

Several techniques have been attempted to make an object a less visible scatterer of electromagnetic radiation such as radar waves.

In a first technique, the object can be covered in materials that absorb the incident radar signals. For example, radar cross section reduction may be achieved over a wide band by placing a lossy dielectrics and radar absorbing materials (RAM) around perfectly conducing spheres. See, e.g., B. Kolundzija, J. Ognjanovic, M. Tasic, D. Olcan, D. Sumic, M. Bozic, M. Kostic, and M. Pavlovic, *WIPL-D Software Users Manual*, WIPL-D d.o.o., Belgrade, 2010; B. Chambers and A. Tennant, "Optimized design of Jaumann radar absorbing materials using a genetic algorithm," *IEE Proceedings—Radar Sonar And Navigation*, 143, 23-30, 1996; and H. C. Strifors and G. C. Gaunaurd, "Scattering of electromagnetic pulses by simple-shaped targets with radar cross section modified by a dielectric coating," *IEEE Transactions On Antennas And Propagation*, 46, 1252-1262, 1998.

In another technique, the object may be shaped or contoured so that most radar of the radar signal is deflected away from the radar source. See M. Skolkik, "Echo Reduction," *Radar Handbook*, $2^{nd}$ Ed., Section 11.5, pp. 11.43-11.51 (1990).

Third, a radar target can be screened by materials that scatter the radar signal before hitting the target and create false targets to confuse the interpretation of the radar data.

To this list of absorption, deflection, and screening is added the fourth so-called "cloaking" technique where the radar signal passes around the target region without either deflection or absorption. H. Mosallaei and Y. Rahmat-Samii, "RCS reduction of canonical targets using genetic algorithm synthesized RAM," *IEEE Transactions on Antennas and Propagation*, 48, 1594-1606, 2000. Deflection produces reduced backscatter with primarily oblique scattering to the sides. Absorption provides reduced radar cross section (RCS) in all directions. True cloaking yields mainly forward scatter similar to scatter from empty space so that no shadows are formed in the forward direction.

The combination of spherical wire grids around solid spheres has not been previously considered for applications to reduce target identification by radar scatter.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides an apparatus for interfering with and canceling electromagnetic reflections from a conducting object such as a solid or hollow conducting sphere. In accordance with the present invention, reflection of an incident electromagnetic (EM) wave from a conducting sphere can be reduced or cancelled by placing a polyhedral conducting mesh (PCM) around the conducting sphere. The incident EM wave induces electric fields in the region between the conducting mesh and the internal conducting sphere. These induced electric fields may interfere with and in some cases may completely cancel the incident EM wave and thus reduce reflection.

In accordance with the present invention, the PCM can be tuned to reduce or cancel reflection of incident EM waves at one or more specific frequencies. In some embodiments, the width of the polyhedron edges can be tuned to provide a desired reduction in backscatter reflection. In other embodiments, the number of polyhedron vertices can be varied, while in others, the diameter of the PCM or of the internal sphere can be adjusted. In all cases the PCM will contain 12 pentagonal faces, with the remaining faces being hexagonal.

BRIEF DESCRIPTION OF THE DRAWINGS

FIGS. 5A-5D illustrate various exemplary configurations of a PCM wire frame surrounding a conducting ball in accordance with the present invention at differing ratios of the diameters of the PCM and the conducting ball.

DETAILED DESCRIPTION

Figure 1:
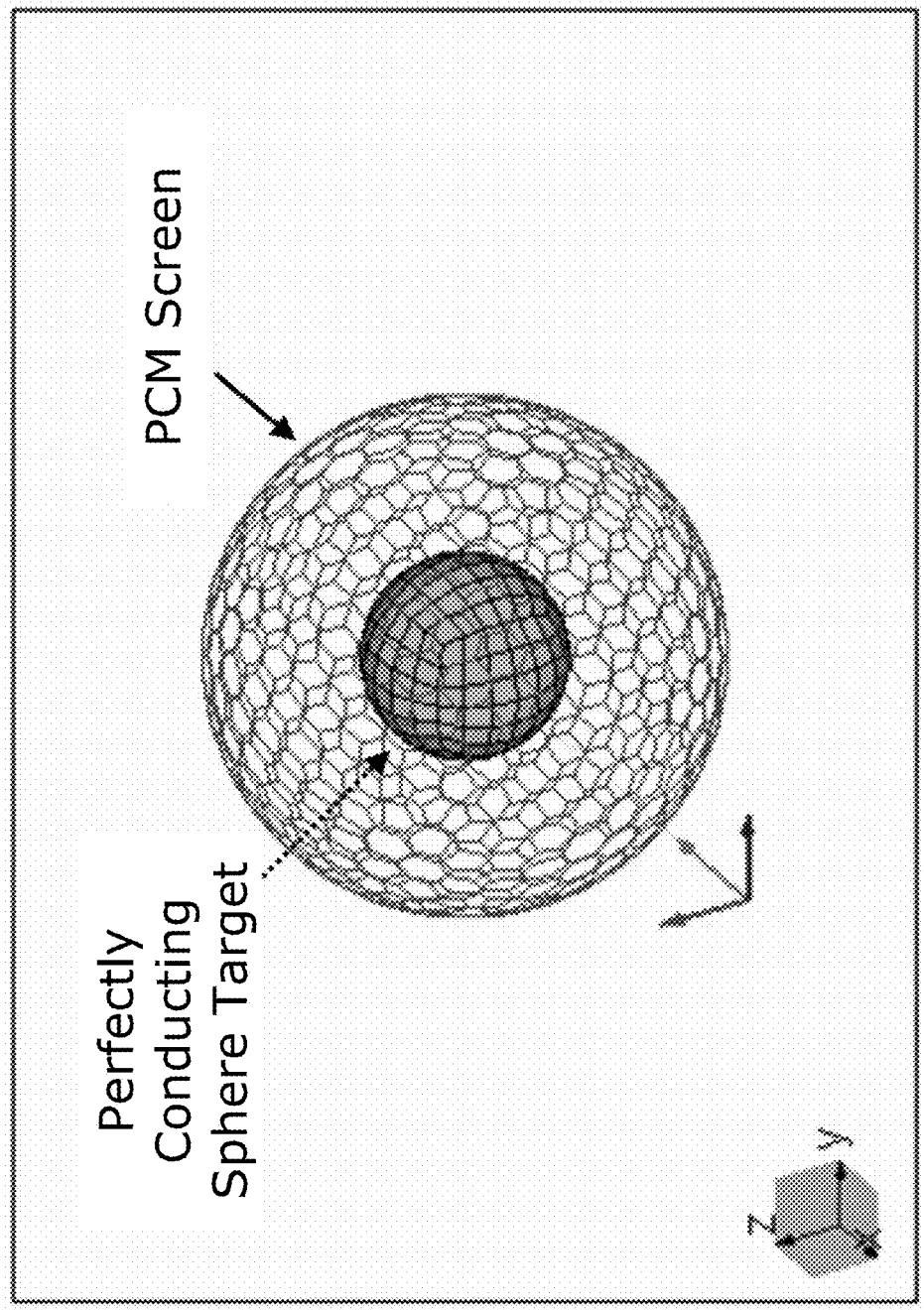
FIG. 1 depicts an exemplary configuration of a PCM surrounding an internal perfectly conducting sphere in accordance with the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the present invention is described in the context of a spherical conducting ball surrounded by a spherical polyhedral conducting mesh, it will be appreciated by one skilled in the art that the principles of surrounding a conducting surface with a conducting mesh described herein can be used to reduce or eliminate radar backscatter echoes from other shaped surfaces as well.

As described in more detail below, the present invention provides an apparatus for interfering with and canceling backscatter echoes from a conducting object such as a conducting sphere. Thus, in accordance with the present invention, reflection of an incident electromagnetic (EM) wave from a conducting sphere can be reduced or cancelled by placing a spherical polyhedral conducting mesh, referred to hereinafter as a "polyhedral conducting mesh" or "PCM", around the conducting sphere. At selected frequencies, the presence of the PCM around the internal conducting sphere can greatly reduce the backscatter of radar signals incident on the apparatus and thus can prevent monostatic radar detection of the solid sphere located at the center of the mesh.

This spherical backscatter reduction is the result of tuned resonance for a specific wire-frame structure at a specific anti-reflection frequency where, at the resonant frequency, the radar backscatter nearly vanishes and the radar pulse is scattered primarily to the forward direction. For the most part, PCM stealth is narrowband around a single frequency.

As described in more detail below, in some embodiments, the width of the polyhedron edges can be tuned to provide a desired reduction in backscatter reflection. In other embodiments, the number of polyhedron vertices can be varied, while in others, the diameter of the PCM or of the internal sphere can be adjusted.

Examples of some of these configurations are described below. However, it should be noted that these configurations merely represent exemplary embodiments and that other configurations may be made and embodiments may be used as appropriate, and all such configurations and embodiments are within the scope and spirit of the present disclosure.

The design of an optimum radar backscatter-canceling PCM in accordance with the present invention can be accomplished using any appropriate electromagnetic wave modeling method that solves the electric field integral equations (EFIE) to describe the scattered waves and simulates the anti-reflection properties of the PCM. Examples of suitable software packages include WIPL-D for simulating the anti-reflection properties of the PCM, and CARLOS, FEKO, and NEC-4 for checking the results. Of course, the software packages identified herein are merely exemplary, and any appropriate software package or modeling method can be used within the scope and spirit of the present disclosure.

FIG. 1 illustrates a generalized exemplary configuration of a solid conducting sphere surrounded by a PCM in accordance with the present invention. Both the internal target sphere and the PCM can be constructed from a conducting material such as aluminum, copper, gold, iron or other conducting metal and can be constructed from the same material or different materials.

A PCM in accordance with the present invention can be constructed of a regular array of wires or strips to form a spherical anti-reflecting surface. The open spaces in the surface of the mesh are composed of regular hexagons and pentagons.

Some exemplary mesh configurations that can be used in accordance with the present invention are set forth in Table 1 below.

TABLE 1

| Number of Vertices | Number of Edges | Number of Faces | Number of Pentagons | Number of Hexagons |
|---|---|---|---|---|
| 20 | 30 | 12 | 12 | 0 |
| 60 | 90 | 32 | 12 | 20 |
| 80 | 120 | 42 | 12 | 30 |
| 180 | 270 | 92 | 12 | 80 |
| 240 | 360 | 122 | 12 | 110 |
| 320 | 480 | 162 | 12 | 150 |

TABLE 1-continued

| Number of Vertices | Number of Edges | Number of Faces | Number of Pentagons | Number of Hexagons |
|---|---|---|---|---|
| 500 | 750 | 252 | 12 | 240 |
| 540 | 810 | 272 | 12 | 260 |
| 960 | 1440 | 482 | 12 | 470 |
| 1500 | 2250 | 752 | 12 | 740 |

It will be noted here that in all cases and all embodiments, irrespective of any of these variables, a PCM in accordance with the present invention will have 12 pentagonal faces, with the remaining faces being hexagonal. In addition, in many cases it will be desirable for each pentagonal face to have an area that is approximately the same as the area of each hexagonal face; by being so configured, the RCS backscatter reduction of the PCM will not vary with the orientation of the PCM relative to the incident radar signal.

The electromagnetic properties of the PCM sphere are determined by the sphere radius and the radii of the conducting edges. The PCM anti-reflection sphere is designed by fixing the overall sphere radius and adjusting the edge radii to allow different amounts of electromagnetic wave energy into the interior. At one frequency—the anti-reflection frequency—the internal wave cancels with the incident wave to produce no reflected wave back to the radar. As noted above, WIPL-D code or similar method-of-moments technique can be used to determine the antireflective properties of any particular PCM sphere configuration, and this can be used to adjust the parameters of the PCM sphere design to achieve the desired antireflection properties of the combined conducting sphere-PCM apparatus.

When PCM-surrounded sphere such as that illustrated in FIG. 1 is subjected to an electromagnetic wave, the electromagnetic wave induces electric fields in the region between the conducting mesh and the internal electrical conducting sphere. These induced electric fields may interfere with and in some cases may completely cancel the incident EM wave and thus reduce backscatter reflection. The solid sphere surrounded by a PCM sphere is a thus spherical resonator with a leaky surface excited by a plane wave.

As described below, in many cases the backscatter suppression can be greater than 20 dB over a narrow frequency range, with a smaller backscatter suppression, e.g., about 8 dB, being achieved over a relatively wide frequency range.

Figure 2:
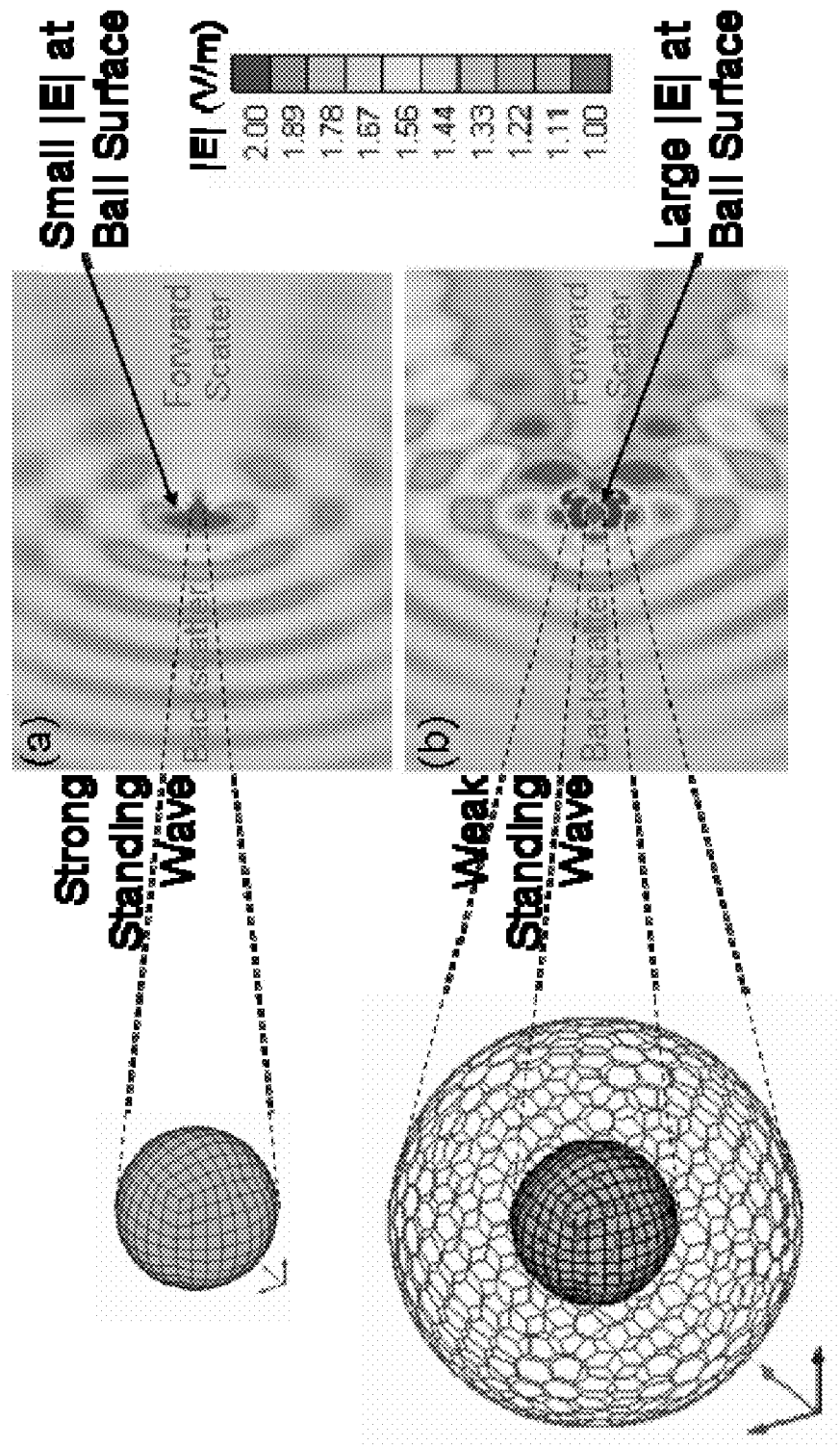
FIG. 2 illustrates different effects of an electromagnetic wave incident on a conducting ball with and without a surrounding PCM in accordance with the present invention.

The presence of large internal electric fields between the mesh and the solid sphere are required to set up the interference between the incident and the reflected waves that causes this backscatter suppression. FIG. 2 illustrates the way in which the presence of a PCM around a solid conducting sphere will induce the production of such large electric fields. In an exemplary embodiment illustrated in FIG. 2, a unit amplitude (1 V/m) incident EM wave is incident on a bare solid conducting ball and on the same conducting ball surrounded by a V960 outer PCM. The inner ball's diameter is 0.24 times the incident wavelength while the diameter of the outer mesh is 0.6 times the wavelength. The length of every edge in the V960 polyhedron is about 1/30 the wavelength of the anti-backscatter frequency, while the diameter of the holes in the mesh surface is about 1/15 of a wavelength.

As illustrated in FIG. 2, when illuminated by the EM wave, the bare ball will experience a small electric field, e.g., less than 1.5 V/m near the ball surface for a 1 V/m incident wave, while PCM-surrounded ball experiences a much larger electric field near the ball's surface, i.e., over 3.5 V/m. The large instantaneous electric fields between the outer and inner shells shown in FIG. 2 show that the resonance effects can be strong. Thus, in the case of the PCM-surrounded ball, the external EM wave can excite a large internal electric field through a mesh much smaller than the incident wavelength.

In addition, as illustrated in FIG. 2, the presence of the PCM around the ball has greatly increased the forward scatter of the incident wave while greatly reducing the backscatter. All of the effects illustrated in the computational examples given for a 10-meter diameter mesh are scalable using the radar wavelength. Radar frequencies range from 3 MHz to over 100 GHz. The radar backscatter reduction for the 10-m diameter mesh shown in FIG. 2 occurs at 18.5 MHz. Wavelength scaling would predict that the anti-backscatter frequency for a 50 mm diameter version of the screened ball shown in FIG. 2 would be 18.5 MHz×10/(0.050)=3.7 GHz. In other words, because wavelength $\lambda$ is proportional to the inverse of the wave frequency f by the formula $\lambda=c/f$ where c is the speed of light, changing the PCM's dimensions by a factor L means that the frequency scaling is f/L.

As noted above and as described in more detail below, in accordance with the present invention, certain aspects of the PCM and/or the internal conducting sphere can be adjusted to produce reduction or cancellation of the backscatter reflected wave. As described below, in some embodiments, the width of the polyhedron edges can be tuned to provide a desired reduction in backscatter reflection. In other embodiments, the number of polyhedron vertices can be varied, while in others, the diameter of the PCM or of the internal sphere can be adjusted.

Figure 3:
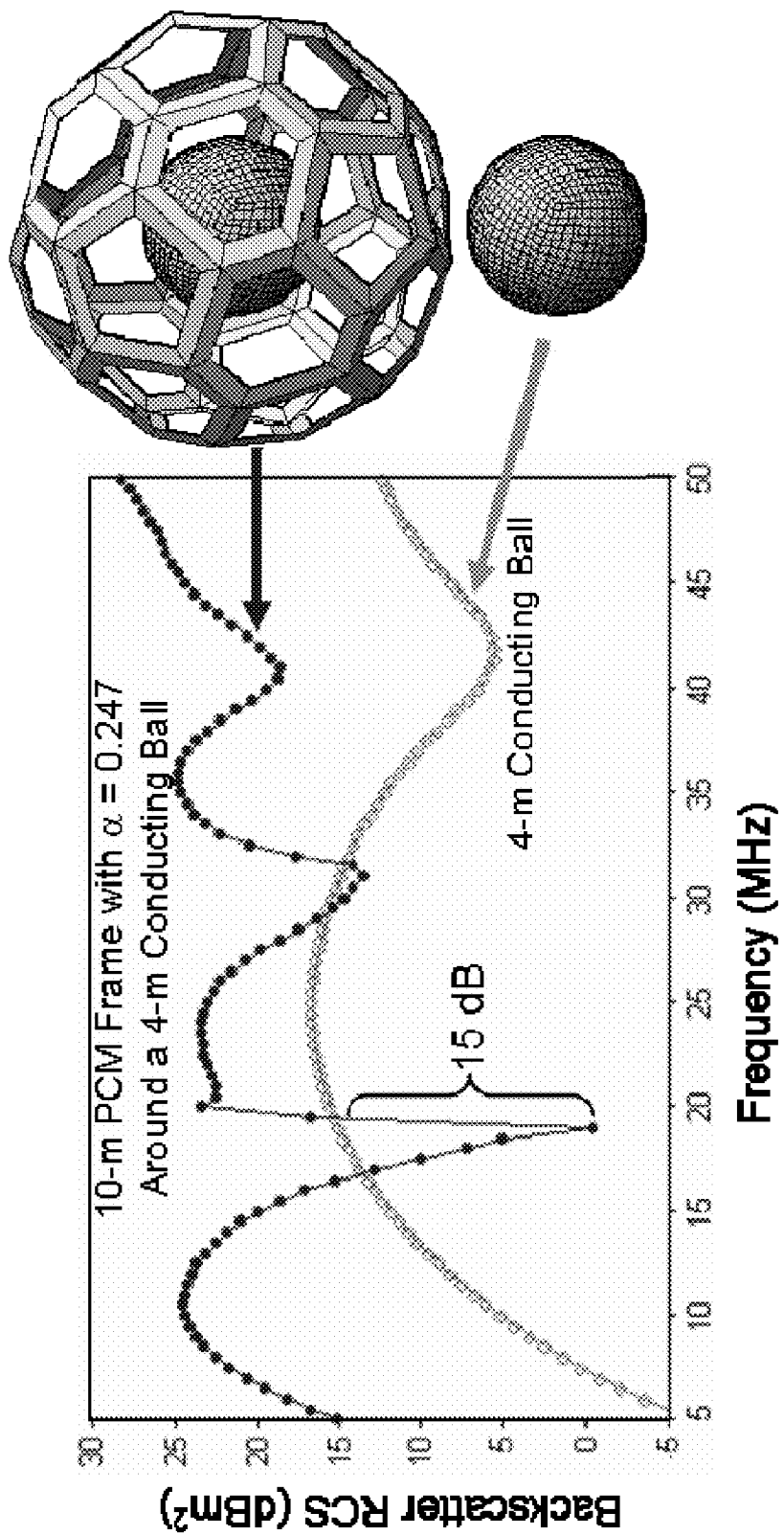
FIG. 3 depicts an exemplary configuration of a 10-m diameter PCM wire frame surrounding a conducting ball in accordance with the present invention and illustrates the reduction in radar cross section backscatter for such a configuration.

Aspects of a first exemplary embodiment of an RCS-reducing PCM-surrounded conducting sphere in accordance with the present invention are illustrated in FIG. 3.

As illustrated in FIG. 3, both a spherical conducting ball and a PCM-surrounded conducting ball in accordance with the present invention were subjected to incoming electromagnetic waves having frequencies ranging from 5 MHz to 50 MHz. The PCM illustrated in FIG. 3 is a simple V60 external polyhedral frame having 60 vertices and 32 wire frame faces, 12 of which are pentagonal and 20 of which are hexagonal.

Figure 4:
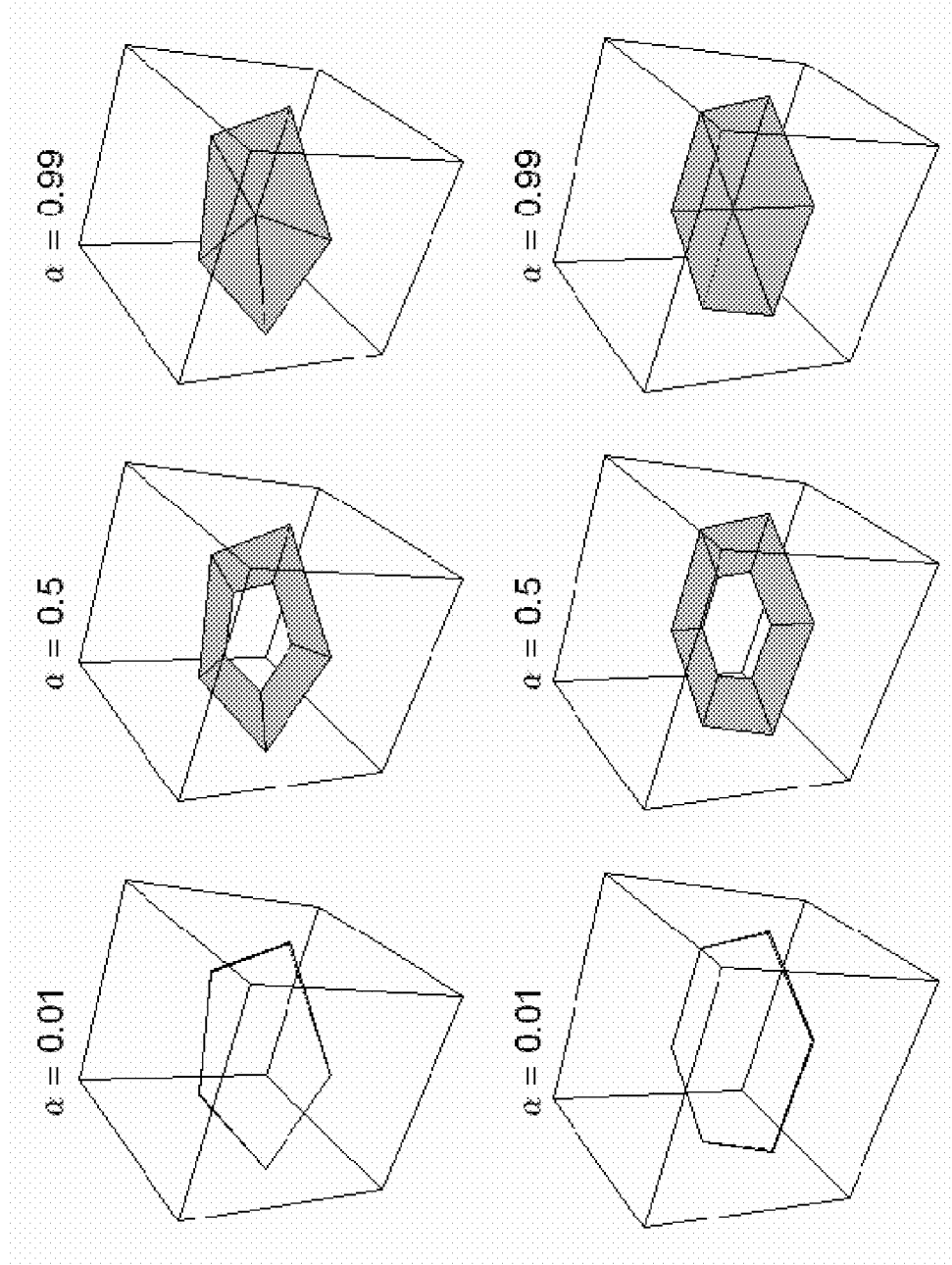
FIG. 4 illustrates aspects of polygonal face edge width tuning in accordance with the present invention.

At 19 MHz, the Mie scatter from a 4-m diameter ball was 15 dBm$^2$. However, when the 10-m tuned V60 PCM was placed around the ball, the RCS at that frequency is reduced to −0.5 dBm$^2$. It should be noted that once the radar frequency deviates from the 19 MHz anti-backscatter frequency, the RCS for the polyhedron-ball combination is much larger than that of the ball alone. Thus, use of a PCM is effective to reduce RCS only at a particular frequency. However, this is acceptable for most radar which do not have the option of changing their operating frequency In accordance with aspects of this embodiment of the present invention, the radar cross section of a PCM-surrounded conducting ball at a particular frequency can be tuned by changing the edge width relative to the distance from the edge to the center of each polygon on the surface of the spherical polyhedron. Each edge of this polyhedron is composed of a flat conducting ribbon with a width that is allowed linearly with parameter a. As illustrated in FIG. 4, the normalized edge width parameter "a" of a polygonal face of the polyhedron can vary between $\alpha \rightarrow 0$ for open faces with wire filament edges to $\alpha=1$ for faces consisting of filled polygon surfaces. Between those two limits a porous spherical shell similar to a "Wiffle Ball" is produced. The greater the value of $\alpha$, the less the electric field will penetrate the PCM to the internal conducting ball, with no electric field penetrating $\alpha=1$. The ideal edge width for minimizing the backscatter at a one frequency in a range of frequencies can be determined by computational numerical minimization using, for example, the WIPL-D software package. Techniques for nonlinear optimization to find the local minimum of a real valued function are described by G. Dahlquist and A. Bjorck, (N. Anderson, Translator), *Numerical Methods*, pp. 438-443, Prentice-Hall, 1974.

During this tuning process, the frequency for minimum backscatter is computed along with the value of the backscatter RCS so that a minimum RCS can be obtained at a particular frequency. In addition, as noted above, by tuning the length of the edges so that all of the polygonal faces have approximately the same area, the minimization of RCS is not dependent on the orientation of the PCM to the incoming radar signal.

In another embodiment of an RCS-reducing PCM-surrounded conducting sphere in accordance with the present invention, instead of the edge width, the number of vertices of the PCM can be varied to produce a desired degree of backscatter reduction. The differences in RCS reduction produced by variations in the number of vertices can be seen by comparing the RCS curves in FIG. 3 and FIG. 6. In FIG. 3, as described above, a tuned V60 (i.e., 60 vertices) mesh is placed around a conducting ball, whereas in FIG. 6, the mesh is of a much higher order, i.e., a V960 mesh having 960 vertices. Although both the tuned V60 mesh shown in FIG. 3 and the tuned V960 mesh shown in FIG. 6 produce a reduction in the RCS from an incident EM wave at 18.5 MHz, the higher order mesh produces a greater reduction, i.e., a reduction of 20 dB for the V960 mesh compared to a 15 dB for the V60 one.

Thus, by increasing the number of vertices and therefore the number of polygonal faces in the mesh, the backscatter RCS for a given incoming radar frequency can be reduced. Moreover, in addition to producing a larger RCS reduction at one specific frequency, a higher-order mesh, with its larger number of surface polygons (e.g., 32 polygons for a V60 mesh versus 432 for a V960 one), can be used for anti-backscatter modes at higher frequencies and can be designed to have lower variation in backscatter with orientation.

In other embodiments of an apparatus for radar target cloaking in accordance with the present invention, the number of polygons making up the PCM and their widths remain fixed, and instead, the diameter of the PCM relative to the internal conducting sphere can be adjusted to minimize the backscatter RCS.

Thus, as illustrated in FIGS. 5A to 5D, a exemplary 960-vertex (V960) wire mesh of varying diameter can be placed around an exemplary concentric 4-m diameter conducting ball and the diameter of the mesh can be adjusted relative to the diameter of the ball, e.g., from $D_{mesh}/D_{ball}=1$ in FIG. 5A to $D_{mesh}/D_{ball}=2.5$ in FIG. 5D. Of course, the changes in the relative diameter ratios can also be achieved by varying the diameter of the internal ball for a fixed-diameter mesh.

Figure 6:
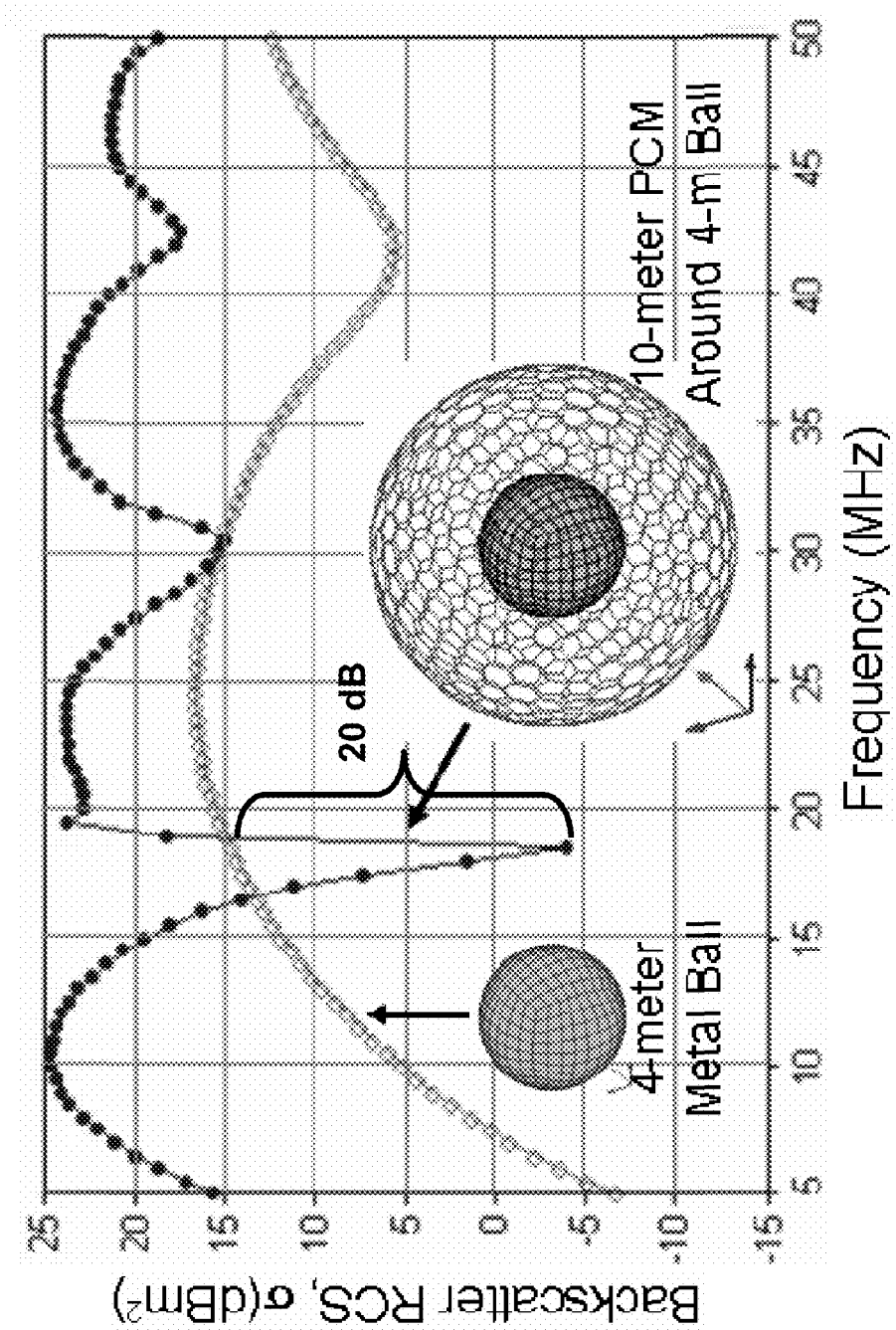
FIG. 6 depicts an exemplary configuration of a PCM wire frame surrounding a conducting ball in accordance with the present invention and illustrates the reduction in radar cross section backscatter for such a configuration.

In the exemplary cases illustrated here, an optimal ratio of the diameters of the internal conducting sphere and the external PCM was determined by using a geometric algorithm executed by Mathematica 7 to compute the structural input files for WIPL-D with a fixed solid surrounded by a given diameter V960 mesh. A right-hand circularly polarized wave was imposed on the composite sphere and the monostatic RCS as a function of frequency was computed. Different anti-backscatter modes were produced with changes in the relative size of the spherical polyhedron As noted above, in the case illustrated in FIG. 6, a significant reduction in the reflection from the 4-m solid sphere was obtained at 18.5 MHz. This level of RCS reduction occurred when the mesh diameter was close to 10.0 meters, i.e., when the mesh diameter was 2.5 times the diameter of the internal solid sphere. At 18.5 MHz, such an apparatus had an RCS backscatter of about $-5.4$ dBm$^2$, which represents nearly a 20 dB reduction from the RCS backscatter of the solid conducting sphere alone. As also can be seen in FIG. 6, the RCS reduction is limited to frequencies between about 17.8 to 18.8 MHz, with the composite sphere-polyhedron object having about 10 dB larger monostatic RCS than the solid sphere by itself at all other frequencies.

Small variations in the PCM diameter can affect the backscatter reduction or the frequency at which the backscatter is minimized. For example, when the diameter of the mesh surrounding a 4-m ball is between 9.7 to 10.4 meters, the reduced RCS is within about 3 dB of the minimum value of $-5.4$ dBm$^2$ and the anti-backscatter frequency varies between 17.8 to 18.8 MHz for a $\Delta f$ of 1 MHz over that diameter variation. Consequently, in the case where the anti-reflection frequency is 18.5 MHz, the $f/\Delta f$ or "Q" of the anti-backscatter resonance is about 18, where Q is a measure of how far from the anti-reflection frequency the radar can transmit and still not detect the object.

Figure 7:
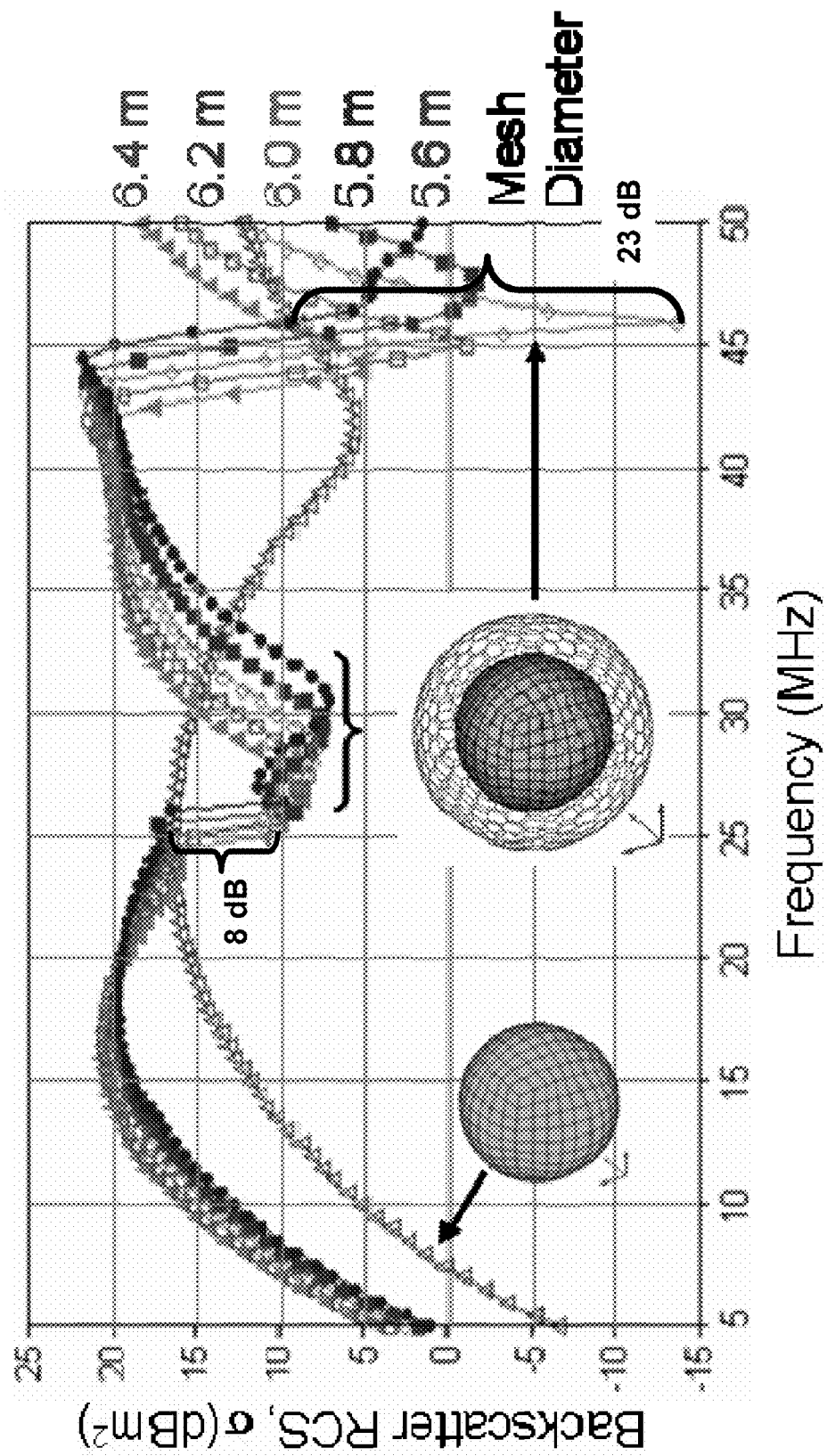
FIG. 7 depicts the effect of various exemplary configurations of a PCM wire frame surrounding a conducting ball at different mesh diameters in accordance with the present invention and illustrates the reduction in radar cross section backscatter for such configurations at a range of frequencies.

As the diameter of the mesh sphere is reduced, new anti-backscatter modes are produced. With a 6-meter diameter spherical V960 polyhedron around a 4-m ball, i.e., $D_{mesh}/D_{ball}=2.5$, two anti-backscatter modes are found, as shown in FIG. 7. First, a narrow RCS minimum notch is found near 46 MHz, where the radar reflection is reduced by 23 dB. Precise tuning of the external sphere size is required to achieve this reduction in radar reflection, with the "Q" of this resonance being about 50. In addition, in this configuration, a second, relatively wide, anti-backscatter region is found near 28 MHz. The monostatic RCS reduction in this region is only 8 dB but it extends from 25 to 30 MHz providing a "Q" of about 5. This indicates that scatter from wider bandwidth radars can be better eliminated using the mode of PCM backscatter reduction.

Figure 8A:
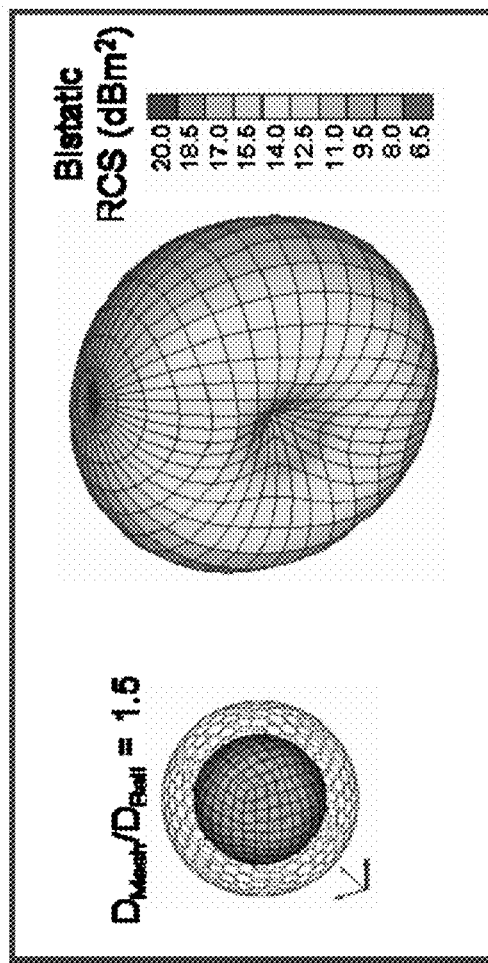
FIGS. 8A and 8B depicts bistatic (all angle) scatter from a PCM-surrounded sphere, and illustrates the reduction in radar echoes in the direction of the incoming radar signal.
Figure 8B:
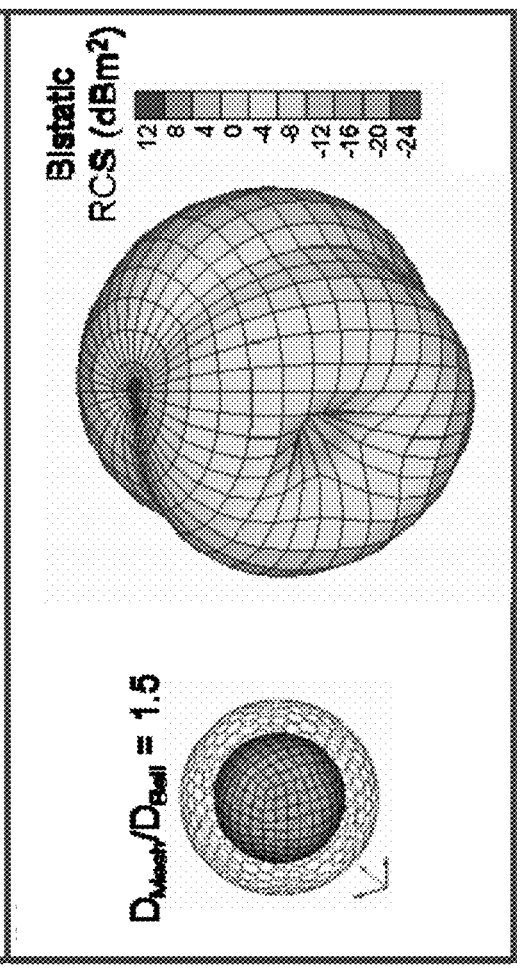

In addition, as shown in FIG. 8A, the bistatic RCS pattern near 28 MHz backscatter reduction shows a single lobe associated with Mode 1, while as shown in FIG. 8B, the bistatic RCS pattern at 46 MHz shows the double lobed pattern associated with Mode 2. Thus, this configuration of the apparatus in accordance with the present invention can operate simultaneously to reduce backscatter at two different frequencies.

Figures 9A, 9B:
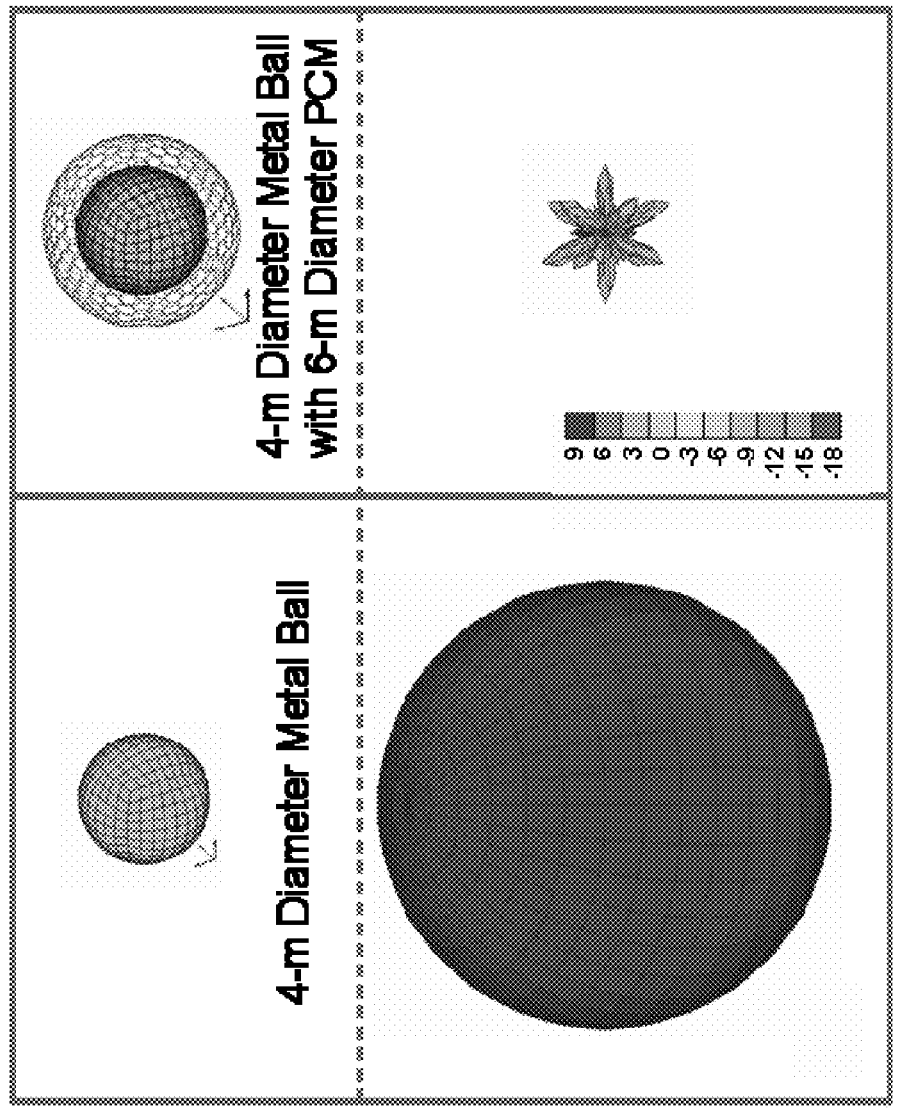
FIGS. 9A and 9B depict the radar backscatter cross section in $dBm^2$ for a solid sphere and a solid sphere surrounded by PCM.

Finally, it is useful to examine the effects of object orientation on the backscatter RCS. FIGS. 9A and 9B illustrate the radar backscatter cross section in dBm$^2$ for a 4-meter metal ball and the same metal ball screened by a 6-meter PCM. As illustrated in FIG. 9A, the backscatter RCS for the bare metal ball is large, i.e., about 9 dBm$^2$, and is uniform in all directions, irrespective of the ball's orientation with respect to the incoming EM wave.

In contrast, the PCM-screened ball illustrated in FIG. 9B exhibits a much reduced backscatter RCS. This backscatter RCS has a minimum of about $-15$ dBm$^2$, about a 20 dB reduction from the backscatter RCS exhibits by the bare ball alone. However, as also can be seen from FIG. 9B, the backscatter RCS for the screened ball exhibits some variation around the minimum, as illustrated by the spikes in the backscatter RCS pattern shown in FIG. 9B. These spikes show that the backscatter RCS varies depending on the orientation of the PCM mesh with respect to the incoming wave, i.e., the depending on the shape of the polygonal face of the PCM mesh that is normal to the incoming wave. The largest backscatter RCS occurs when a pentagonal face is normal to the incoming wave, while the smallest backscatter occurs when a hexagonal face is normal. This difference is due to the difference in area of a pentagonal face versus a hexagonal one, with the pentagonal face having a smaller area than the hexagonal one. Thus, in accordance with the present invention, the PCM can be tuned to reduce this orientation-caused variation in RCS reduction by adjusting the lengths of the edges of the mesh to cause pentagon faces to have about the same area as the hexagons. Nevertheless, it can readily be seen from FIGS. 9A and 9B that even with the variations with orientation, the presence of a PCM screen around the metal ball causes a significant reduction in backscatter RCS.

Thus, accordance with the present invention, the backscatter radar cross-section of a conducting object can be reduced or minimized by surrounding the conducting object with a polyhedral conducting mesh, where any one or more of the width of the mesh edges, the number of mesh vertices, and the diameter of the mesh relative to the internal conducting object can be varied to achieve an RCS minimum at a particular frequency.

Many applications exist that can exploit the anti-backscatter properties of the apparatus of the present invention. For example, the apparatus can be used for radar stealth, where the internal object can be made nearly invisible to monostatic radar in a narrowband frequency range. The scattered radar waves will not be transmitted in the direction of the radar and the physical target sphere will be not be detected by the radar.

Figure 10:
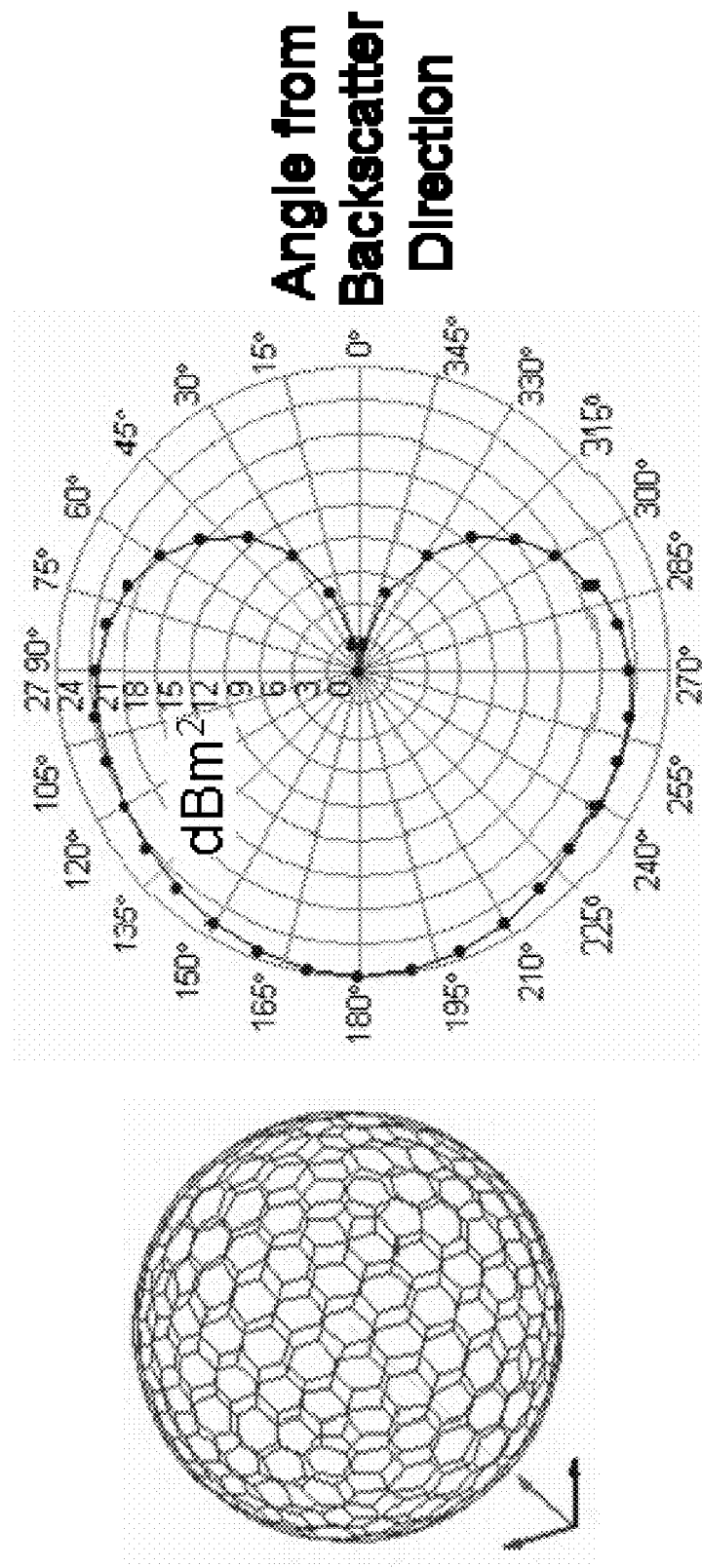
FIG. 10 depicts a polar diagram of the backscatter radar cross section of the PCM, and shows that large scatter occurs in all directions except back to the incident radiation source.

In addition, the apparatus according to the present invention can be used as a radar calibration target that suppresses monostatic reflection and thus minimizes possible damage by backscatter to a high-power EM wave generator. The RCS reflection of such a target in accordance with the present invention is shown in FIG. 10. In the example illustrated in FIG. 10, a PCM sphere having 540 vertices, 810 2-mm wide edges, 470 hexagon faces, and 12 pentagon faces surrounded a conducting ball and this apparatus was illuminated by an 18 MHz electromagnetic wave. As shown in FIG. 10, the PCM-surrounded conducting ball provided quasi-isotropic scatter of the incident wave, with a minimum amount of energy going back to the antenna (i.e., nearly 0 dbm$^2$ at the 0° backscatter direction). Suppression of scatter back to an electromagnetic wave source may also be important to prevent measurement interference by secondary scatter from the transmit antenna.

A PCM-shielded conducting target in accordance with the present invention can also be used as a radar calibration target in an anechoic chamber. The target would scatter the incident signal in all directions except back to the source. This would protect a high power radio source from damage and would prevent unwanted scatter by the radio wave generating antenna.

Although particular embodiments, aspects, and features have been described and illustrated, it should be noted that the invention described herein is not limited to only those embodiments, aspects, and features, and it should be readily appreciated that modifications may be made by persons skilled in the art.

The present application contemplates any and all modifications within the spirit and scope of the underlying invention described and claimed herein, and all such embodiments are also contemplated to be within the scope and spirit of the present disclosure.

What is claimed is:

1. An apparatus for reducing a backscatter echo of an electromagnetic wave incident on a target object, comprising:
   an electrically conducting target object, the electrically conducting target object reflecting the incident electromagnetic wave to create reflected waves in a plurality of scattering directions; and
   an electrically conducting polyhedral conducting mesh (PCM) surrounding the target object, the PCM substantially conforming to a shape of the target object and comprising a surface grid of polyhedrons each having a plurality of edges and an associated plurality of vertices, each of the edges having a length and a width, a length of the edges being much less than one half of a wavelength of an anti-backscatter frequency of the incident electromagnetic wave;
   wherein the PCM is configured to produce an induced electric field between the PCM and the target object when the target object is subjected to the incident electromagnetic wave, the induced electric field being configured to create interference between the incident electromagnetic wave and the reflected waves that reduces or cancels the reflected waves in a backscatter direction toward a source of the incident electromagnetic wave, thereby reducing the backscatter echo of the electromagnetic wave from the target object.

2. The apparatus according to claim 1, wherein the target is a conducting sphere and the PCM is a spherical conducting mesh.

3. The apparatus according to claim 1, wherein the incident electromagnetic wave is a radar signal.

4. The apparatus according to claim 1, wherein the backscatter echo is reduced by at least 20 dB.

5. The apparatus according to claim 1, wherein at least one characteristic of at least one of the edges is tuned to achieve a desired reduction in the backscatter echo.

6. The apparatus according to claim 5, wherein the width of at least one of the plurality of edges is tuned to achieve the desired reduction in the backscatter echo.

7. The apparatus according to claim 5, wherein a number of vertices in the PCM is tuned to achieved the desired reduction in the backscatter echo.

8. The apparatus according to claim 5, wherein a diameter of the PCM relative to a diameter of the target object is tuned to achieve the desired reduction in the backscatter echo.

9. The apparatus according to claim 5, wherein the PCM is tuned to reduce the backscatter echo at a specified frequency of the incoming electromagnetic wave.

10. The apparatus according to claim 5, wherein the PCM is tuned to reduce the backscatter echo at a plurality of frequencies of the incoming electromagnetic wave.

11. The apparatus according to claim 1, wherein a surface of the PCM comprises 12 pentagons and a remaining number of hexagons, an area of each of the pentagons and each of the hexagons being approximately equal such that the reduction in backscatter echo is not substantially affected by an orientation of the PCM with respect to the incoming electromagnetic wave.

12. The apparatus according to claim 1, wherein the incident electromagnetic wave is scattered off the target object in a nearly omnidirectional manner with minimal scatter in a source direction of the incident electromagnetic wave.

13. The apparatus according to claim 1, wherein the apparatus is configured for use as a radar calibration target.

14. The apparatus according to claim 13, wherein the apparatus is configured for use as a radar calibration target in an anechoic chamber.

15. The apparatus according to claim 3, wherein the apparatus is nearly invisible to an incoming radar signal due to the reduction in backscatter echo.

16. The apparatus according to claim 1, further comprising a plurality of individual target objects and a single PCM, wherein the single PCM surrounds the plurality of individual target objects to form a compound object with a reduced backscatter echo.

17. The apparatus according to claim 1, wherein a length of at least one of the edges of the PCM is tuned to achieve a desired reduction in the backscatter echo.

18. The apparatus according to claim 1, wherein the PCM comprises a plurality of openings, each having a diameter much smaller than a wavelength of the electromagnetic wave incident on the target object.

19. The apparatus according to claim 18, wherein a diameter of each of the openings in the PCM is 1/15 of the wavelength of the electromagnetic wave incident on the target object.

20. A method for reducing a backscatter echo from an electromagnetic wave incident on a conducting target, the conducting target object reflecting the incident electromagnetic wave to create reflected waves in a plurality of scattering directions, the method comprising surrounding the target with a polyhedral conducting mesh (PCM), the PCM substantially conforming to a shape of the target object and comprising a surface grid of polyhedrons each having a plurality of edges and an associated plurality of vertices, each of the edges having a length and a width, a length of the edges being much less than one half of a wavelength of an anti-backscatter frequency of the incident electromagnetic wave;

wherein the PCM is configured to produce an induced electric field between the PCM and the target object when the target object is subjected to the incident electromagnetic wave, the induced electric field being configured to create interference between the incident electromagnetic wave and the reflected waves that reduces or cancels the reflected waves in a backscatter direction toward a source of the incident electromagnetic wave, thereby reducing the backscatter echo of the electromagnetic wave from the target object.

21. The method according to claim 20, further comprising tuning a length of at least one of the edges to achieve a desired reduction in the backscatter echo.

22. The method according to claim 20, further comprising tuning a width of at least one of edges to achieve a desired reduction in the backscatter echo.

23. The method according to claim 20, further comprising tuning a number of the plurality of vertices to achieve a desired reduction in the backscatter echo.

24. The method according to claim 20, further comprising tuning a diameter of the PCM relative to a diameter of the target object to achieve the desired reduction in the backscatter echo.

* * * * *